United States Patent [19]

Meyer et al.

[11] 3,979,451
[45] Sept. 7, 1976

[54] PROCESS FOR THE PRODUCTION OF THIOPHOSGENE

[75] Inventors: Gerhard Meyer; Helmut Mägerlein, both of Obernburg; Hans-Dieter Rupp, Kassel-Bettenhausen, all of Germany

[73] Assignee: Akzona Incorporated, Asheville, N.C.

[22] Filed: May 22, 1974

[21] Appl. No.: 472,090

[30] Foreign Application Priority Data

May 24, 1973 Germany............................ 2326396

[52] U.S. Cl............................... 260/543 H; 260/543 R
[51] Int. Cl.²........................................ C07C 145/00
[58] Field of Search...................... 260/543 R, 543 H

[56] References Cited

UNITED STATES PATENTS 3,699,161  10/1972  Magerlein........................ 260/543 R

FOREIGN PATENTS OR APPLICATIONS 2,018,381  11/1971  Germany

*Primary Examiner*—Norman Morganstern
*Attorney, Agent, or Firm*—Johnston, Keil, Thompson & Shurtleff

[57] ABSTRACT

A process for the production of thiophosgene by the reduction of trichloromethanesulfenyl chloride with hydrogen sulfide at an elevated temperature and in contact with silica gel, the molar ratio of the hydrogen sulfide to trichloromethanesulfenyl chloride being from 1.5:1 to 4:1.

5 Claims, No Drawings

PROCESS FOR THE PRODUCTION OF THIOPHOSGENE

The present invention represents an improvement over our earlier issued patent, U.S. Pat. No. 3,699,161 wherein a process is disclosed for the production of thiophosgene by reduction of trichloromethanesulfenyl chloride by means of hydrogen sulfide at an elevated temperature, especially by carrying out the reaction at a temperature of about 120°C. to 180°C. on silica gel as a catalyst. In this earlier patent, it was recommended that the trichloromethanesulfenyl chloride and hydrogen sulfide be reacted in stoichiometric proportions since the use of an excess of hydrogen sulfide favored the formation of carbon disulfide as an undesirable byproduct. On the other hand, the use of an excess of hydrogen sulfide would naturally be of some advantage in ensuring a quantitative reaction of the trichloromethanesulfenyl chloride so as to facilitate the working up of the reaction mixture and avoiding a need to recover the unreacted trichloromethanesulfenyl chloride. Also, excess hydrogen sulfide does permit the reaction to be carried out at the lower temperatures of the range given in our earlier patent. On balance, there had been nothing to favor working outside of approximatey stoichiometric proportions of the two reactants because the presence of either trichloromethanesulfenyl chloride or carbon disulfide in the reaction mixture after completion of the reduction was highly prejudicial against using an excess of either reaction component.

It has now been found, in accordance with the present invention, that the previously disclosed process can be surprisingly improved if the hydrogen sulfide is used in excess within certain prescribed limits, in particular by using a molar ratio of hydrogen sulfide to trichloromethanesulfenyl chloride of about 1.5:1 to 4:1 and preferably from 1.5:1 to 2.5:1. The reaction temperature in this improved process should at least be about 110°C., and in general it is desirable to work at temperatures of about 110°C. to 150°C., preferably about 115°C. to 135°C.

When the reducing reaction is carried out under these prescribed conditions, it was unexpectedly found that one achieves not only a practically quantitative reaction of the trichloromethanesulfenyl chloride but also an extraordinarily high selectivity with reference to the conversion to thiophosgene. This discovery overcomes the prejudice which we raised against the use of an excess of hydrogen sulfide in our own prior work. Moreover, the results now obtained were most unexpected by comparison with other prior art as well as general theoretical considerations. The highly advantageous and improved results of the present invention will be more fully understood in view of the following particulars.

In order to achieve both the highest possible reaction of the trichloromethanesulfenyl chloride and its conversion into thiophosgene, it is essential to employ the hydrogen sulfide reactant in an excess of at least about 50 mol percent. The preferred molar ratio as noted above is about 1.5:1 to 2.5:1. If this molar ratio exceeds about 4:1 as an upper limit, the selectivity for the formation of thiophosgene drops with a corresponding increase in the formation of carbon disulfide. The loss of thiophosgene then becomes most unsatisfactory, especially at the higher reaction temperatures.

The reaction of the present invention should generally be carried out at about 110°C. to 150°C., especially 115°C. to 135°C. Sulfur which results as another reaction product is still liquid under the given conditions up to about 110°C. because it contains traces of the remaining reaction products dissolved therein so as to lower its melting point from 113°C. At temperatures below 110°C., the crystallization of sulfur cannot be avoided with certainty and such crystallization and the resulting deposition of sulfur leads to a severe disturbance of the process. For this reason, the temperature in the reactor should not fall below 110°C.

It would be possible to prevent the crystallization of the sulfur by the use of an inert solvent, thereby permitting the reaction to be conducted at a temperature below 110°C., but this would be disadvantageous due to the resulting expensive working up of the reaction mixture.

Temperatures higher than 150°C. should be avoided because noticeable amounts of carbon disulfide arise under these conditions with the selectivity for the formation of thiophosgene being correspondingly diminished.

In its most preferred embodiment, the process of the invention is carried out at about 115°–135°C. while using a molar ratio of hydrogen sulfide to trichloromethanesulfenyl chloride of 1.5:1 to 2.5:1. Under these conditions, the reaction of the trichloromethanesulfenyl chloride proceeds almost quantitatively and the selectivity with reference to thiophosgene formation of up to 97% is achieved. At the designated temperatures, a further increase in the excess amount of hydrogen sulfide does not increase the amount of trichloromethanesulfenyl chloride being reacted but does reduce the selectivity.

As silica gel, one can employ commercially available materials just as in our earlier patent. It is not unconditionally necessary that the silica gel being introduced for the reaction first be made free of traces of metal, especially of iron. However, because it has been determined that iron traces do slightly reduce the selectivity, particularly on the order of about 0.2%, it is preferred to employ an iron-free silica gel as the essential catalyst. The separation of iron from various silica gel products can be carried out in a simple manner by extraction with hydrochloric acid.

The process of the present invention, as in our earlier patent, can be carried out either continuously or discontinuously and in a co-current or counter-current stream. A continuous process carried out with a co-current stream of the reactants in a reaction tube filled with silica gel is especially preferred.

The throughput of trichloromethanesulfenyl chloride per liter of silica gel in such a continuous process depends primarily on the reaction temperature. At 110°C., even at an hourly throughput of about 110 grams of trichloromethanesulfenyl chloride per liter of silica gel and also with a high excess of hydrogen sulfide, one can achieve a quantitative reaction. With increasing reaction temperature, one can naturally increase the hourly throughput, for example to about 135 grams at 120°C. and about 160 grams at 130°–140°C., the weight in grams being that of the trichloromethanesulfenyl chloride per liter of silica gel. In general, a further increase in throughput by raising the temperature even further tends to be disadvantageous because of an accompanying reduction of the selectivity with respect to the formation of thiophosgene.

In addition, the throughput is also determined by the molar ratio of the two reactants. At the same throughput, the selectivity in forming thiophosgene drops with an increasing excess of hydrogen sulfide, i.e. at an increasing molar ratio of hydrogen sulfide to trichloromethanesulfenyl chloride within the prescribed range. Therefore, it is preferable in the process according to the present invention to provide an hourly throughput in the range of about 80 to 220 grams of trichloromethanesulfenyl chloride per liter of silica gel. An hourly throughput of about 300 grams of trichloromethanesulfenyl chloride per liter of silica gel represents an uppermost limit, because any higher throughput would cause an unacceptable reduction in the completeness of the reaction and the yields of thiophosgene.

The working up of the gaseous reaction mixture can proceed in the usual manner, i.e. by a fractional condensation.

The following examples illustrate the invention, and it will be understood that the invention is not restricted to these examples where in fact the critical conditions of the improved process have been determined by a relatively large number of corresponding tests.

EXAMPLES

A double jacketed reaction tube made of glass and having a length of 1 meter and an inner diameter of 15 mm. was filled with 120 grams of silica gel having a particle size of 1.5 to 1.3 mm. and a bulk density of 0.7 kg./liter. The tube was heated with the aid of a variable thermostat.

Over two conduits at the top of the reaction tube, there were continuously introduced by means of a dosing pump (a) trichloromethanesulfenyl chloride and over a flow meter (b) hydrogen sulfide gas. The resulting sulfur was captured at the bottom end of the reaction tube in a small flask heated to 135°C. The gaseous reaction product was likewise drawn off at the bottom end of the reaction tube and condensed in a cooler at −35°C.

In the following Table, the results of seven different examples are summarized, all results being determined after an extended reaction period of at least 24 hours or more. The headings in this table are self-explanatory, the two reactants being indicated by their formula $H_2S$ = hydrogen sulfide
$Cl_3CSCl$ = trichloromethanesulfenyl chloride.

TABLE

| Ex. No. | Reaction temp. (°C.) | Molar Ratio $H_2S:Cl_3CSCl$ | Throughput $g.Cl_3CSCl$ per liter of silica gel | $Cl_3CSCl$ Reaction (%) | Thiophosgene Selectivity (%) |
|---|---|---|---|---|---|
| 1 | 130 | 2 | 165 | 94.2 | 93.7 |
| 2 | 130 | 2 | 132 | 95.9 | 94.1 |
| 3 | 120 | 4 | 132 | 99.2 | 94.2 |
| 4 | 115 | 4 | 132 | 97.5 | 95.7 |
| 5 | 115 | 4 | 110 | 100 | 96.3 |
| 6 | 115 | 3 | 110 | 100 | 96.1 |
| 7 | 115 | 2 | 110 | 100 | 96.4 |

The invention is hereby claimed as follows:

1. In a process for the production of thiophosgene wherein trichloromethanesulfenyl chloride is reduced by reaction with hydrogen sulfide at an elevated temperature and in contact with silica gel, the improvement which comprises conduction the reaction at a temperature of at least about 110°C. up to about 150°C. with a molar ratio of hydrogen sulfide to trichloromethanesulfenyl chloride of about 1.5:1. to 4:1.

2. A process as claimed in claim 1 wherein the temperature of the reaction is about 115°C. to 135°C.

3. A process as claimed in claim 1 wherein said molar ratio is about 1.5:1 to 2.5:1.

4. A process as claimed in claim 3 wherein the reaction temperature is about 115°C. to 135°C.

5. A process as claimed in claim 1 wherein the process is carried out with an hourly addition of about 80 to 220 grams of trichloromethanesulfenyl chloride per liter of silica gel.

* * * * *

UNITED STATES PATENT AND TRADEMARK OFFICE
CERTIFICATE OF CORRECTION

PATENT NO. : 3,979,451
DATED : September 7, 1976
INVENTOR(S) : Gerhard Meyer et al It is certified that error appears in the above-identified patent and that said Letters Patent are hereby corrected as shown below:

Column 4, line 34, "conduction" should read --conducting--.

Signed and Sealed this

Twenty-first Day of March 1978

[SEAL]

Attest:

RUTH C. MASON
Attesting Officer

LUTRELLE F. PARKER
Acting Commissioner of Patents and Trademarks